United States Patent [19]

Lee

[11] 4,413,895

[45] Nov. 8, 1983

[54] ELECTROMAGNETIC ACTUATOR HAVING A COMPLIANT ARMATURE

[75] Inventor: James K. Lee, Pittsford, N.Y.

[73] Assignee: Eastman Kodak Company, Rochester, N.Y.

[21] Appl. No.: 379,372

[22] Filed: May 17, 1982

Related U.S. Application Data

[63] Continuation-in-part of Ser. No. 360,494, Mar. 22, 1982, which is a continuation-in-part of Ser. No. 219,168, Dec. 22, 1980, Pat. No. 4,333,722.

[51] Int. Cl.³ .......................... G03B 9/08; H02K 1/22
[52] U.S. Cl. ..................................... 354/234; 310/268
[58] Field of Search ................. 310/268; 354/234, 271

[56] References Cited

U.S. PATENT DOCUMENTS

| | | | |
|---|---|---|---|
| 3,092,002 | 6/1963 | Trenk | 95/58 |
| 3,191,516 | 6/1965 | Corcoran | 95/59 |
| 3,353,131 | 11/1967 | Stubbs et al. | 336/130 |
| 3,561,847 | 2/1971 | Kitsopoulos et al. | 350/272 |
| 3,987,473 | 10/1976 | Kondo | 354/234 |
| 3,993,920 | 11/1976 | Sato | 310/66 |
| 4,005,448 | 1/1977 | Iwata et al. | 354/30 |
| 4,024,552 | 5/1977 | Kondo | 354/234 |
| 4,041,512 | 8/1977 | Iwata et al. | 354/234 |
| 4,079,400 | 3/1978 | Kondo | 354/234 |
| 4,143,288 | 3/1979 | Sato | 310/66 |

FOREIGN PATENT DOCUMENTS

| | | |
|---|---|---|
| 887007 | 7/1953 | Fed. Rep. of Germany . |
| 2616636 | 10/1976 | Fed. Rep. of Germany . |
| 2939751 | 5/1980 | Fed. Rep. of Germany . |
| 3003462 | 8/1980 | Fed. Rep. of Germany . |

Primary Examiner—Michael L. Gellner
Attorney, Agent, or Firm—Thomas H. Close

[57] ABSTRACT

An electromagnetic actuator of the type having an armature positioned for movement in a magnetic gap is characterized by the armature being sufficiently compliant so as to allow the armature to contact the sides of the gap, and easily conform to the shape of the gap. The magnetic gap is substantially coextensive with the armature, for providing mechanical support to the armature.

In one embodiment of the invention, the compliant armature is employed in a reciprocating actuator for a photographic shutter/aperture. In another embodiment, the invention is employed in a rotary DC motor of the pancake type. In a still further embodiment, the invention is employed in a rotary DC motor of the cup or basket type.

24 Claims, 10 Drawing Figures

ELECTROMAGNETIC ACTUATOR HAVING A COMPLIANT ARMATURE

This is a continuation-in-part of U.S. patent application Ser. No. 360,494 entitled "Electromagnetic Actuator Having a Compliant Armature" filed Mar. 22, 1982, which is a continuation-in-part of U.S. patent application Ser. No. 219,168 entitled "Method of Controlling Electromagnetic Actuator in a Camera and Actuator Controllable Thereby" filed Dec. 22, 1980 by J. K. Lee, now U.S. Pat. No. 4,333,722.

BACKGROUND OF THE INVENTION

Cross reference is made hereby to U.S. patent application Ser. No. 360,941 entitled "Intergrated Electromechanical Camera Control Mechanism" filed Mar. 22, 1982 by J. K. Lee.

FIELD OF THE INVENTION

This invention relates to electromagnetic actuators of the type having a flat armature positioned in a magnetic gap, and more particularly to such actuators wherein the armature comprises a conductive pattern formed on an insulating substrate.

DISCUSSION RELATING TO THE PROBLEM

Compact low cost electromechanical actuators such as DC motors are employed in a wide variety of consumer products from toys to tape recorders and cameras. In many such applications, to take best advantage of available space in the apparatus, a thin flat actuator is desirable since thin flat spaces are more readily available than bulky cubic or prismatic volumes. To this end, it is known to employ an electromagnetic actuator having a thin flat armature which resides for movement in a magnetic gap. U.S. Pat. No. 3,993,920 issued Nov. 23, 1976 to Sato shows a flat circular motor useful for example in a tape recorder.

One embodiment of the motor called a pancake motor, comprises a housing and a flat permanent stator magnet forming an annular magnetic gap between the magnet and one side of the housing. A thin flat circular armature comprises a printed circuit coil photofabricated on a thin stiff sheet of insulating material and hving a central axle perpendicular to the plane of the armature. The armature is supported in the magnetic gap of the motor by a pair of bearings.

Another embodiment of the motor, commonly called a cup or basket motor comprises a housing and a cylindrical permanent magnet forming a cylindrical magnetic gap between the magnet and the side of the housing. A thin cylindrical armature comprises a printed circuit coil photofabricated on a thin stiff sheet of insulating material and formed into a cylinder. The armature has a central axel along the axis of the cylinder. The armature is supported in the magnetic gap by a pair of bearings.

In a motor of this type it is desirable to make the magnetic gap as small as possible to increase the intensity of the magnetic field in the gap and therefore increase the efficiency of the motor. However, because the gap is narrow and the distance between the bearings is small in comparison with the diameter of the armature, the slightest misalignment between the bearings during manufacture or assembly or wear of the bearings during use (causing the shaft of the armature to tilt) results in the armature coming into contact with the field magnet or the housing and produces frictional drag on the armature. The frictional drag can cause the motor to run erratically or be stopped altogether. Similarly, when the diameter of the axle is reduced to reduce friction and thereby reduce bearing wear, flexing of the axle may result in the armature coming into contact with the sides of the narrow magnetic gap with similar undesirable consequences.

Another type of flat electromagnetic actuator used for example to drive a shutter blade in a photographic camera, is the reciprocating actuator disclosed in U.S. Pat. No. 4,024,552 issued May 17, 1977 to Toshihiro Kondo. The actuator disclosed by Kondo includes a planar conductive coil embedded in an opaque plastic blade. The blade serves as a shutter blade and is slidably supported in grooves in the camera body and one of the legs of the coil resides in a magnetic gap. A spring urges the shutter blade toward a closed position, and when a current is applied to the coil, the blade slides in the grooves to open the shutter. The blade must be stiff enough to support itself in the grooves. Unfortunately, when a relatively stiff blade is even slightly canted in mounting grooves, due to any imbalance of force on the blade, relatively high frictional forces are developed causing the blade to be slowed or stick in the grooves.

The present invention is directed toward a solution of the above noted friction problems in electromagnetic actuators.

SOLUTION—SUMMARY OF THE INVENTION

According to the present invention, friction related problems in planar electromagnetic actuators are alleviated by making the armature compliant, and supporting the armature by the sides of the magnetic gap in which it resides. The armature contacts and is supported by the sides forming the gap, and being flexible, easily conforms to the shape of the gap without generating excessive frictional forces.

According to a preferred embodiment of the invention, compliant armatures for reciprocating and rotary actuators are constructed by photofabricating conductive coils on the surface of thin insulating plastic film; for example, 1–3 mil thick polyethylene terephthalate. The resulting actuators are compact, reliable, efficient and economical to manufacture. Due to the flexible nature of the armatures, manufacturing tolerances can be considerably relaxed, thereby resulting in substantial manufacturing savings.

An armature is deemed "compliant" in accordance with the present invention, if in a stationary condition, within its supported environment, and in its intended operation, as a result of its flexibility, a portion(s) of its surface is allowed to contact a portion(s) of the means forming the electromagnetic gap wherein its moves. It will be appreciated that the "compliant" characteristic as defined above will depend upon several factors, e.g. the mechanical compliance of the armature material, the size of the armature, the location of its support axis and the width of the gap within which it is supported. However, the characteristic as defined above describes that overall functional nature of an armature-stator relation in accord with the present invention which results in reduced frictional drag with lessened criticality of fabrication and assembly tolerance.

The armatures disclosed in the prior art are deemed "stiff" since their shape is predominantly influenced by their structure. "Compliant" armatures according to the present invention are distinguished from the prior art in that their shape is substantially influenced by their environment.

According to one embodiment of the invention, the compliant armature is employed as a reciprocating element of an electromagnetic actuator for a photographic shutter/aperture. In another embodiment of the invention, the compliant armature is employed as the rotor element in a rotary motor.

BRIEF DESCRIPTION OF THE DRAWINGS

The invention will be described with reference to the accompanying drawings wherein.

DESCRIPTION OF THE PREFERRED EMBODIMENTS

Figure 1:
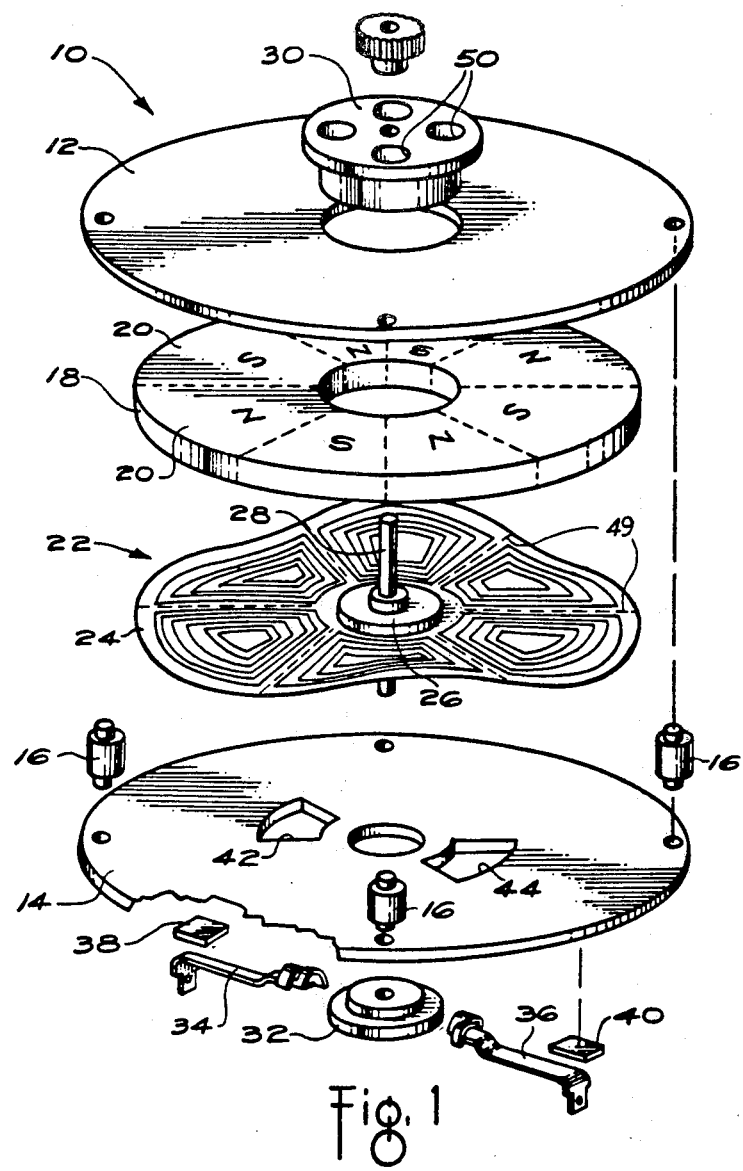
FIG. 1 is an exploded perspective view of a compliant armature rotary motor of the pancake type according to the present invention.

FIG. 1 shows an exploded perspective view of a flat rotary motor having a compliant armature according to the present invention.

An armature is deemed "compliant" in accordance with the present invention, if in a stationary condition, within its supported environment, a portion(s) of its surface contacts a portion(s) of the means forming the electromagnetic gap wherein its moves. It will be appreciated that the "compliant" characteristic as defined above will depend upon several factors, e.g. the flexibility of the armature material, the size of the armature, the location of its support axis and the width of the gap within which it is supported. However, the characteristic as defined above describes that overall functional nature of an armature-stator relation in accord with the present invention which results in reduced frictional drag with lessened criticality of fabrication and assembly tolerance.

An armature is deemed "stiff" if its shape is predominantly influenced by its structure. In contrast, the shape of a compliant armature according to the present invention is substantially influenced by its environment.

Figure 3A:
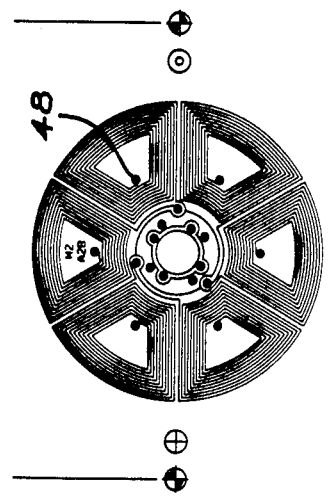
FIG. 3a and b are plan views of the top and bottom printed conductor patterns for the compliant armatures of the rotary motors shown in FIG. 1 and 4.

The motor 10 comprises a housing formed by mild steel top and bottom plates 12 and 14 respectively. The top and bottom plates are held in spaced relation by spacer columns 16. A thin flat annular magnet 18 having eight equal adjacent segments 20 magnetized in opposite directions perpendicular to the plane of the magnet is attached, for example by epoxy adhesive, to the underside of top plate 12. A printed circuit compliant armature 22 comprises a film disc 24 bearing an electrical conductor pattern formed by photolithographic techniques. FIGS. 3a and b show the masks for forming the conductive patterns on the top and bottom sides respectively of the film disc 24. The armature 22 includes a hub 26 to which the film disc is attached, and the hub is mounted on an axle 28. The axle 28 is supported in the top and bottom plates 12 and 14 by bearing blocks 30 and 32 comprised for example of Delrin plastic.

Figure 3B:
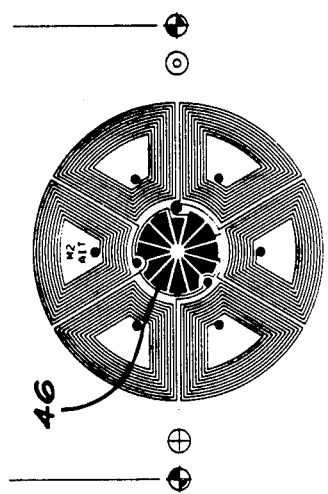

A pair of brushes 34 and 36 are mounted on the underside of the bottom plate 14 on insulating pads 38 and 40 respectively. The brushes extend through openings 42 and 44 in the bottom plate to contact a commutator pattern formed on the bottom of film disc 24. The commutator pattern (comprising pie-shaped segments 46) is shown in FIG. 3b.

The printed circuit conductor pattern is formed on the film in the following manner:

First, holes are drilled in the film (for example, by laser drilling apparatus) at locations where electrical contacts are to be made from one side of the film to the other. These locations are indicated by the black dots 48 in FIG. 3a. Next, a thin coating of copper (e.g. 1000 to 10,000 Å thick) is applied to both sides of the film in an electroless plating bath. A negative photoresist is then applied to both sides of the plated film, and the conductor patterns shown in FIGS. 3a and b are exposed on the top and bottom sides of the film respectively. The resist is then removed in the dark areas in FIGS. 3a and b and the exposed copper coating is electroplated up to approximately the thickness of the photoresist (about 1 mil).

During this process, the through holes are plated to provide electrical conduction from one side of the film to the other. After the electroplating, the remaining photoresist is removed from the film, and the film is exposed to a mild etchant to remove the thin electroless coating of copper. The finished disc is then cut from the sheet of film and attached to the hub 26 and axle 28. This armature fabrication technique lends itself well to continuous automated production of printed circuit compliant armatures from a roll of film.

The inside surface of bottom plate 14 and the underside of magnet 18 are coated with a Teflon (polytetrafluoroethylene) paint to provide a low friction bearing surface and an electrical insulation for the compliant armature 22.

To further increase the compliance of the armature, the armature may be slit radially between the conductor coils, for example along the dotted lines 49 in FIG. 1.

Figure 2:
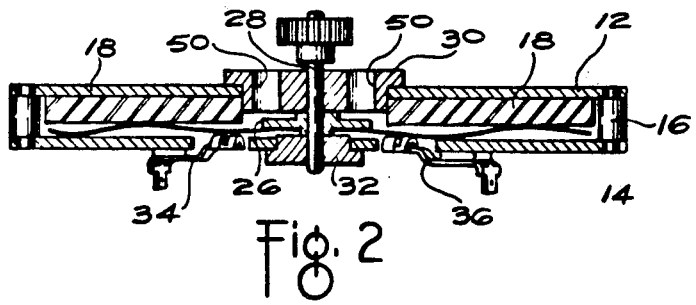
FIG. 2 is a cross-sectional view of the compliant armature motor shown in FIG. 1.

A cross sectional view of the assembled motor is shown in FIG. 2. The compliant armature is held in and conforms to the magnetic gap formed between magnet 18 and bottom plate 14.

In operation, the armature slides on the inside surfaces of the motor housing, and since the armature is compliant, no excessive or irregular frictional forces are generated. It was expected from experience with the prior art planar motors that contact of the armature with the magnet or the motor housing would cause serious problems with wear and inefficiency of the motor due to friction. On the contrary, it has been discovered that the compliance of the armature aids the operation of the motor and wear has been negligible. The measured efficiency of the motor has been hiher than conventional rigid armature motors.

In operation, as the motor speed increases, centrifugal forces and aerodynamic forces on the armature tend to cause the armature to "fly" in the magnetic gap, thereby further reducing frictional forces. The term "fly" as used herein means that the armature becomes more nearly planar and more nearly centered in the magnetic gap as a result of the centrifugal and aerodynamic forces. Air passages 50 are provided in the top bearing block to allow air to enter the housing near the hub and to flow radially outward toward the edge of the armature over the top of the film disc. Air enters the openings 42 and 44 in the bottom plate 14 near the hub and flows radially outward over the bottom of the film disc. The film disc is thereby aerodynamically stabilized in the magnetic gap as the motor reaches running speed.

It has also been found that with the compliant armature, bearing alignment for the planar motor is relatively noncritical, and manufacturing tolerances for the location and assembly of the bearings can be considerably relaxed.

Figure 4:
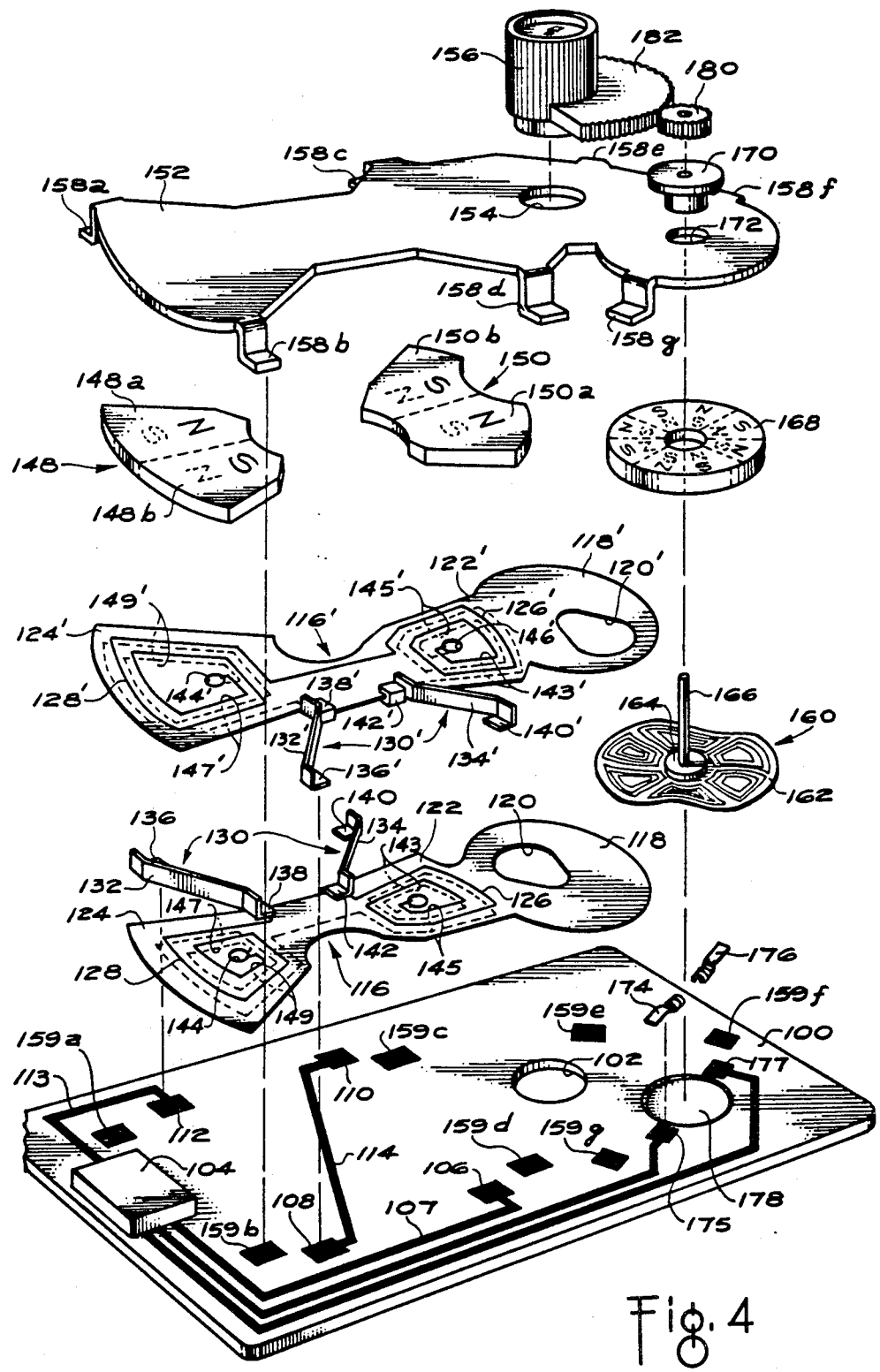
FIG. 4 is an exploded perspective view of a camera mechanism including a reciprocating compliant armature shutter/aperture actuator and a rotary compliant armature focus motor according to the present invention.

The present invention may also be employed in an actuator having a reciprocating armature. FIG. 4 is an exploded perspective view showing a presently preferred embodiment of the invention employed in a reciprocating shutter/aperture actuator, and a rotary focus drive motor in a photographic camera mechanism.

The camera mechanism is supported on a mechanism plate 100 which forms an aperture 102. The mechanism plate, made from 24 gauge mild steel, is covered with a layer of electrically insulating porcelain enamel. Electrical conductors and mounting pads are formed on the surface of the enamel by the process of screen printing a pattern on the enamel using an ink containing a powdered metal, and firing the ink to sinter the powdered metal. Conductive mounting pads 106 and 112 are connected to an electronic control circuit 104 by conductors 107 and 113 respectively. Mounting pads 108 and 110 are electrically connected to each other by a conductor strip 114.

The reciprocating shutter/aperture actuator includes two pivoting compliant armatures with two planar coils on each armature. A first armature generally designated 116 includes an aperture blade 118 defining a tapered aperture 120 for progressively uncovering fixed aperture 102, and two coil support portions 122 and 124. Two spiral coils 126 and 128 are formed on the coil support portions 122 and 124 respectively. The armature is formed from 1 to 3 mil thick polyethylene terephthalate film loaded with one micron size particles of carbon to render the film opaque. The armature is about seven centimeters long and about 2.5 centimeters wide at its widest point. The spiral coils are formed on the surface of the armature using the photofabrication techniques outlined above.

The armature is supported for pivotal movement by a flexure hinge 130 comprising a pair of leaf springs 132 and 134 formed from 2 mil thick beryllium copper sheet metal. The flexure hinge defines a virtual pivot at the point where the projection of the leaf springs intersect. Leaf spring 132 defines tabs 136 and 138 projecting at right angles from the spring on each end. Tab 138 is bent around the edge of the armature and is soldered to a mounting pad formed at the end of the coil on the armature. Similarly, leaf spring 134 defines tabs 140 and 142 at each end, tab 142 being attached to the armature. Coil 128 starts where leaf spring 132 is connected to the armature and proceeds on the top surface of the armature, as viewed in FIG. 4, winding counterclockwise in an inward spiral and into a through-hole 144 in the center of the coil. The coil emerges on the other side of the armature to continue in a counterclockwise spiral out from the center as shown in dotted lines in FIG. 4. The conductor pattern proceeds across the underside of the armature to the other coil support portion 122 counterclockwise in an inward spiral around support portion 122 to a center through-hole 146 and back up to the top surface of the armature. The conductor then defines an outward spiral on the top surface of conductor support 122 ending at the mounting pad for flexure spring 134 where tab 142 makes electrical contact with the coil. As shown in FIG. 4, coil 126 defines two legs 143 and 145 arranged generally radially of the virtual pivot point defined by flexure hinge 130, i.e. generally perpendicular to the direction of movement of the armature. Likewise, coil 128 defines two legs 147 and 149 arranged generally radially of the virtual pivot defined by the flexure hinge 130. Tabs 136 and 140 on the other sides of the flexure leaf springs are soldered to mounting pad 112 and 110 respectively. A second armature generally designated 116' is identical to the first armature 116 except that it has been turned over on its back. The parts of armature 116' are numbered similarly to the parts of armature 116 with primes ('). Tabs 136' and 140' of leaf spring 132' and 134' respectively, are soldered to mounting pads 108 and 106 respectively. Preferably, the leaf springs are attached to the mounting pads using the technique of reflow soldering, wherein a sticky paste of powdered solder and flux is applied to the mounting pads, the part to be soldered is positioned, and the contact region is heated causing the solder to flow. Alternatively, a conductive epoxy bonding technique may be employed.

A permanent ceramic magnet 148, approximately 3 mm thick produces the magnetic fields in the vicinity of coils 128 and 128'. The magnet 148 is magnetized in a direction perpendicular to its top and bottom surfaces (as viewed in FIG. 4). One-half of magnet 148 (designated 148a) is magnetized with the north magnetic pole on the top and the south magnetic pole on the bottom, and the other half (designated 148b) is magnetized with the south magnetic pole on the top and the north magnetic pole on the bottom. A second permanent ceramic magnet 150 similar to magnet 148, produces the magnetic fields in the vicinity of coils 126 and 126'. The magnets 148 and 150 are cemented to the underside of a holder 152 made from 24 gauge mild steel.

Holder 152 defines an aperture 154 for mounting a taking lens 156. Magnet holder 152 has seven mounting tabs 158a-g, for supporting the magnetic holder in spaced relation with the mechanism plate 100. The mounting tabs are soldered to mounting pads 159a-g respectively to secure the magnet holder to the mechanism plate and to suspend the magnets over the coils of the armature and form a gap between the magnets and the mechanism plate 100 in which the armatures 116 and 116' reside.

To reduce static friction between the compliant armatures and the sides forming the gap, and to provide electrical insulation for the conductors on the armature, the armatures are coated with a thin layer of Teflon plastic in the form of spray paint. Alternatively, the armatures may be separated by thin sheets of Teflon plastic interposed between the armatures and between the armatures and the sides forming the gap and attached at one edge of the mechanism plate 100. This alternative has the virtue of reducing the mass of the armatures and thereby producing an actuator with a faster response time.

When the positive terminal of an electrical power supply is connected to mounting pad 112 and the negative terminal of the power supply is connected to mounting pad 106, current flows counterclockwise in coils 128 and 126, and clockwise in coils 128' and 126'. The forces generated on the coils due to the currents flowing in the magnetic fields produced by permanent magnets 148 and 150, cause armature 116 to pivot in a clockwise direction, and armature 116' to pivot in a counterclockwise direction, thereby moving blades 118 and 118' cooperatively to uncover aperture 102.

The forces on the armatures 116 and 116' of the actuator are proportional to the current flowing in the coils. The position of the actuator, and hence the extent to which the fixed aperture 102 is uncovered by blades 118 and 118', is controlled by the control circuit 104 by controlling the amount of current supplied to the actuator. Since the armatures of the actuator are compliant according to the present invention, the tendency of the armatures 116 and 116' to become wedged in the narrow magnetic gap between the magnet and the mechanism plate 100 is greatly reduced, and a highly efficient and reliable shutter actuator results.

The rotary lens driving motor includes a circular compliant armature 160 having a film disc 162 bearing a photofabricated conductive pattern on its top and bottom surfaces such as that shown in FIGS. 3a and b respectively. The armature 160 includes a hub 164 supported on an axle 166. The hub is attached to the center of the film disc 162. The film disc 162 is approximately 3 centimeters in diameter and is preferably fabricated on one mill thick polyethylene terephthalate film, or other suitable insulating film material having similar compliance. The motor includes a flat annular magnet 168, which is magnetized in eight equal segments with alternating direction of magnetization perpendicular to the plane of the magnet. The magnet is attached to the underside of magnet holder 152 and is supported by the magnet holder over the mechanism plate to form a magnetic gap therebetween in which resides the compliant armature 160. A bearing insert 170 preferably made from Delrin plastic (an acetal resin type plastic manufactured by Dupont Corporation) is received in an aperture 172 in magnet holder 152. A pair of brushes 174 and 176 are attached to mounting pads 175 and 177 respectively, and are suspended in cantilever fashion over a depression 178 formed in the mechanism plate 100. The depression is formed by a coining operation prior to the application of the insulating enamel coating on the mechanism plate. The brushes are formed from a suitably springy material (e.g. 2 mil thick berryllium copper sheet) and are installed so that they maintain contact with the commutator pattern on the bottom of the armature 160.

A small gear 180 is mounted on axle 166 in engagement with a sector gear 182 connected to lens 156, for driving lens 156 to a desired focus position. Mechanism plate 100 and the underside of magnet 168 are coated with a thin film of Teflon to reduce friction and provide electrical insulation for the conductor pattern on armature 162.

Figure 5:
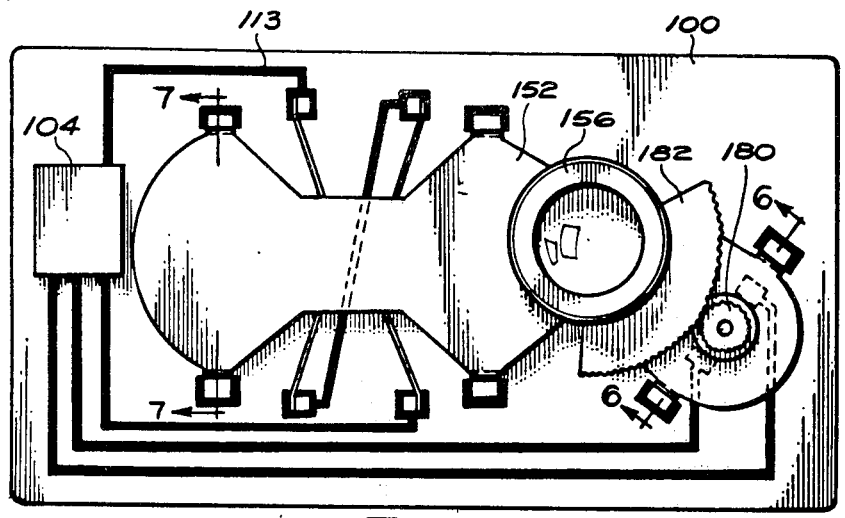
FIG. 5 is a plan view of the camera mechanism shown in FIG. 4.
Figure 6:
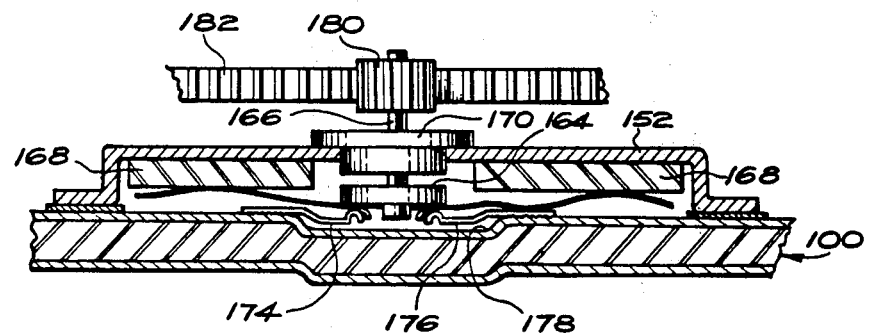
FIG. 6 is a cross-sectional view of the rotary compliant armature motor taken along lines 6—6 in FIG. 5.

FIG. 5 is a plan view of the assembled camera control mechanism. FIG. 6 is a cross-sectional view of the rotary compliant focus motor according to the present invention taken along lines 6—6 in FIG. 5. Since bearing alignment and exact amerature position is not critical with the compliant armature motor according to the present invention, no bottom bearing is provided for the rotary motor. The cantilever brushes 174 and 176 are self biased into contact with the commutator of the armature.

Figure 7:
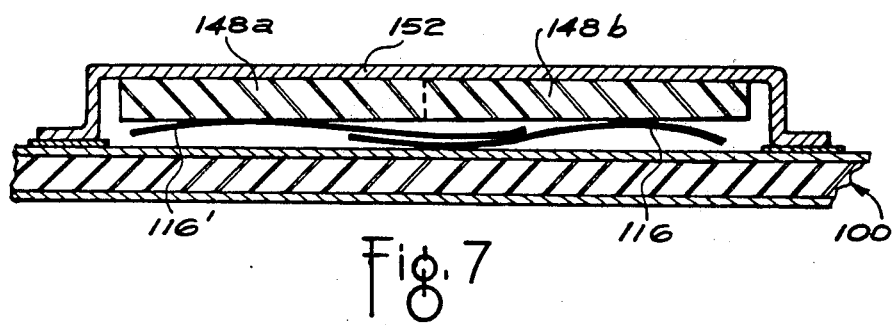
FIG. 7 is a cross-sectional view of the reciprocating compliant armature shutter/aperture actuator taken along line 7—7 in FIG. 5.

FIG. 7 is a cross-sectional view of the reciprocating compliant armature shutter/aperture actuator according to the present invention, taken along line 7—7 in FIG. 5.

Figure 8:
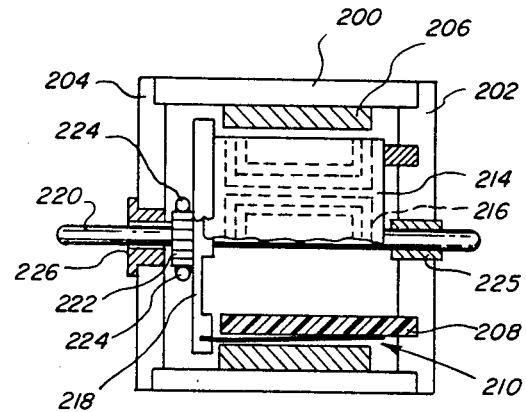
FIG. 8 is a cross-sectional view of a compliant armature rotary motor of the cup type according to the present invention.

The present invention may also be employed in an electromagnetic actuator of the type wherein the magnetic gap is curved in one dimension. FIG. 8 is a cross-sectional view of a rotary motor having a cup or basket type armature. The motor includes a housing comprising a cylindrical wall 200 formed from mild steel, and a pair of circular end plates 202 and 204. Within the housing, a cylindrical magnet 206 is attached to the inside of cylindrical wall 200, and is magnetized in a direction generally radially of the cylindrical axis in a plurality of segments magnetized in alternately opposite directions. A cylindrical pole piece 208, likewise formed from mild steel is supported by end plate 202 to define a thin cylindrical gap 210 between the magnet and the pole piece. A compliant cup type armature 212 resides in the magnetic gap 210. The armature 212 comprises a cylinder 214 formed from thin insulating plastic (e.g. 1-3 mil thick polyethylene terephthalate film) bearing an electrical coil pattern 216 defined by the photofabricating techniques outlined above. The coil pattern may be formed on a rectangular strip of sheet material, then the material rolled and bonded edge-to-edge to form the cylindrical configuration. The cylinder 214 is held by a hub 218 mounted on an axel 220. A portion of the hub includes a commutator 222, contacted by brushes 224 in a known manner. The axel is supported in the end plates 202 and 204 of the housing by bushings 225 and 226. In operation, the compliant armature easily conforms to the shape of the magnetic gap thereby minimizing the rubbing friction of the motor without the need for tightly controlling the tolerance of bearing alignment.

The compliance of the armature may be further increased by slitting the insulating sheet material between the coils.

Figure 9:
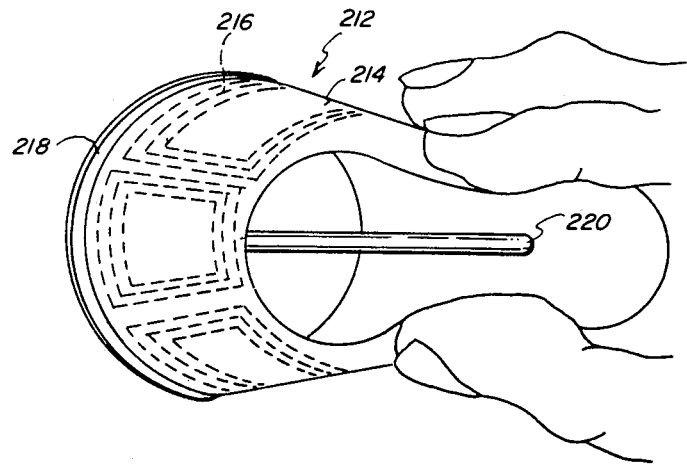
FIG. 9 is a perspective view of the compliant cup type armature of the rotary motor shown in FIG. 8, illustrating its change in shape in response to its environment.

FIG. 9 is a perspective view of the compliant armature, being held by its open end, dramatically illustrating how its shape is substantially influenced by its environment.

The invention has been described in detail with particular reference to certain preferred embodiments thereof, but it will be understood that variations and modifications can be effected within the spirit and scope of the invention. For example, although the preferred method of producing the compliant armatures is by the use of photofabrication techniques, the conductive pattern on the flexible insulating film could also be applied by screen printing techniques using conductive inks. Furthermore, in the examples described above, it was assumed that the compliant armature was mounted for movement with respect to other apparatus. It is well known in the art, that the armature may be fixed, and the field producing means be mounted for movement.

I claim:

1. An electromagnetic actuator of the type having means for forming a substantially planar magnetic gap and a flat armature positioned for movement in the magnetic gap, said actuator being characterized in that a portion of said armature is sufficiently compliant to contact and generally conform to the shape of said gap, and in that portions of said gap are substantially coextensive with said armature, for supporting said armature in a direction generally perpendicular to the path of said armature movement.

2. The invention claimed in claim 1 wherein said electromagnetic actuator is a rotary motor and said armature is a rotor having a central axle supporting a central portion of said armature for movement in said gap.

3. The invention claimed in claim 2 wherein said actuator further comprises means for admitting air near said axle between said armature and said gap forming means, whereby said armature flies in said gap when said motor is running.

4. The invention claimed in claim 1 wherein said electromagnetic actuator is a recriprocating type actuator and said armature is mounted for reciprocating movement in said gap.

5. The invention claimed in claim 1 further characterized by friction reducing means disposed between said compliant armature and said magnetic gap forming means.

6. The invention claimed in claim 5 wherein said friction reducing means comprises a coating of polytetrafluoroethylene plastic on the sides of said magnetic gap forming means.

7. The invention claimed in claim 5 wherein said friction reducing means comprises a coating of polytetrafluoroethylene plastic on said armature.

8. The invention claimed in claim 5 wherein said friction reducing means comprises thin sheets of polytetrafluoroethylene plastic disposed between said compliant armature and the sides of said magnetic gap forming means.

9. In combination with a photographic camera, an electromagnetic actuator comprising:
a mild steel plate;
a flat magnet having a first portion magnetized in a first direction generally perpendicular to the plane of said magnet, and a second portion magnetized in a generally opposite direction;
means for mounting said magnet over said plate to form a magnetic gap;
an armature mounted for movement in said gap, said armature comprising a planar conductor coil on a sheet of insulating material, and being sufficiently compliant to contact the sides of said gap, said magnet and said plate providing support for said armature in a direction generally perpendicular to its plane.

10. The invention claimed in claim 9 wherein said armature comprises a photofabricated conductor on a sheet of insulating material.

11. The invention claimed in claim 10 wherein said insulating material is polyethylene terephthalate film between 1 to 3 mils thick.

12. The invention claimed in claim 9 further comprising friction reducing and electrically insulating means between said armature and the sides of said gap.

13. The invention claimed in claim 9 wherein said actuator is a reciprocatory actuator and said compliant armature is mounted for reciprocating movement in said gap for driving a shutter blade.

14. The invention claimed in claim 13 wherein an extension of said sheet of insulating material defines a shutter blade.

15. The invention claimed in claim 14 wherein said insulating material is polyethylene terephthalate film between 1 to 3 mils thick, loaded with one micron size particles of carbon to render the film opaque.

16. The invention claimed in claim 9, wherein said actuator is a rotary DC motor and said compliant armature is a rotor.

17. The invention claimed in claim 16 wherein the commutator of said DC motor is formed by photofabrication techniques on said compliant armature.

18. An electromagnetic actuator of the type having an armature positioned for movement between means defining a magnetic gap, characterized by said armature being sufficiently compliant so as to contact the gap defining means and easily conform to the shape of said gap, said gap defining means being substantially coextensive with said armature for providing mechanical support to said armature and substantially influencing the shape of said armature.

19. The invention claimed in claim 18, wherein said armature includes flexible conductor means defining a coil.

20. The invention claimed in claim 18, wherein said armature comprises a sheet of flexible insulating material and a flexible conductor defining a coil carried by said flexible sheet.

21. The invention claimed in claim 20, wherein said flexible conductor is formed on said insulating sheet material by photofabrication techniques.

22. An electromagnetic actuator of the type having means for defining a magnetic gap, and conductor means positioned in said gap, said gap defining means and said conductor means being moveable relative to one another, characterized by said conductor means being sufficiently compliant so as to conform to the shape of said gap, whereby frictional forces between said gap defining means and said conductor means are limited.

23. The invention claimed in claim 22, wherein said conductor means comprises a flexible sheet of electrically insulating material, and a flexible conductor pattern carried by said insulating sheet.

24. The invention claimed in claim 23, wherein said conductor pattern is formed on said flexible sheet by photofabrication techniques.

* * * * *

Disclaimer 4,413,895.—*James K. Lee*, Pittsford, N.Y. ELECTROMAGNETIC ACTUATOR HAVING A COMPLIANT ARMATURE. Patent dated Nov. 8, 1983. Disclaimer filed Dec. 21, 1983, by the assignee, *Eastman Kodak Co.*

Hereby enters this disclaimer to claims 1–24 of said patent.

[*Official Gazette February 21, 1984.*]